United States Patent [19]
Miller et al.

[11] Patent Number: 4,981,165
[45] Date of Patent: Jan. 1, 1991

[54] SPRING ADJUSTMENT DEVICE FOR OVERHEAD DOORS

[75] Inventors: Eugene J. Miller; Randal J. Buenzli, both of McHenry, Ill.

[73] Assignee: Millco Products, Inc., McHenry, Ill.

[21] Appl. No.: 336,245

[22] Filed: Apr. 11, 1989

[51] Int. Cl.$^5$ ............................................. E05F 11/00
[52] U.S. Cl. .................................................... 160/191
[58] Field of Search ............... 160/191, 192, 201, 133; 16/299; 185/10, 39

[56] References Cited

U.S. PATENT DOCUMENTS

| | | | |
|---|---|---|---|
| 1,416,071 | 5/1922 | Smurr . | |
| 1,926,452 | 9/1933 | Norling | 242/107 |
| 1,933,925 | 11/1933 | Norling | 242/107 |
| 1,943,453 | 1/1934 | Norling | 242/107 |
| 1,968,536 | 7/1934 | Norling | 242/107 |
| 2,072,582 | 3/1937 | Douglas | 242/107 |
| 2,083,467 | 6/1937 | Morris | 160/201 |
| 2,294,360 | 9/1942 | Blodgett | 160/191 |
| 2,311,703 | 2/1943 | Sihyonen | 160/191 |
| 2,520,618 | 8/1950 | Winter | 160/315 |
| 2,660,753 | 12/1953 | Moler | 160/191 |
| 2,749,570 | 6/1956 | Alder | 16/198 |
| 3,635,277 | 1/1972 | Bahnsen | 160/191 |
| 3,921,761 | 11/1975 | Votroubek | 160/192 |
| 4,817,927 | 4/1989 | Martin | 160/191 |

Primary Examiner—Ramon O. Ramirez
Assistant Examiner—Robert A. Olson
Attorney, Agent, or Firm—Neuman, Williams, Anderson & Olson

[57] ABSTRACT

An overhead door mechanism with torsion type counterbalance springs includes a spring adjustment device comprising a housing suitable for attachment to a horizontal shaft and a gearing mechanism that allows angular adjustment of the attached end of the spring relative to the shaft. The gearing mechanism includes a toothed ring gear member adapted for connection to the spring and rotatably mounted in the housing. A threaded worm is also mounted in the housing so that it engages the teeth of the toothed member. Rotation of the threaded worm induces a corresponding rotation of the toothed member. The rotation, when conveyed to one end of a spring that is fixed at its other end causes the spring torsion to be altered without releasing the spring from retention by the adjustment mechanism.

26 Claims, 1 Drawing Sheet

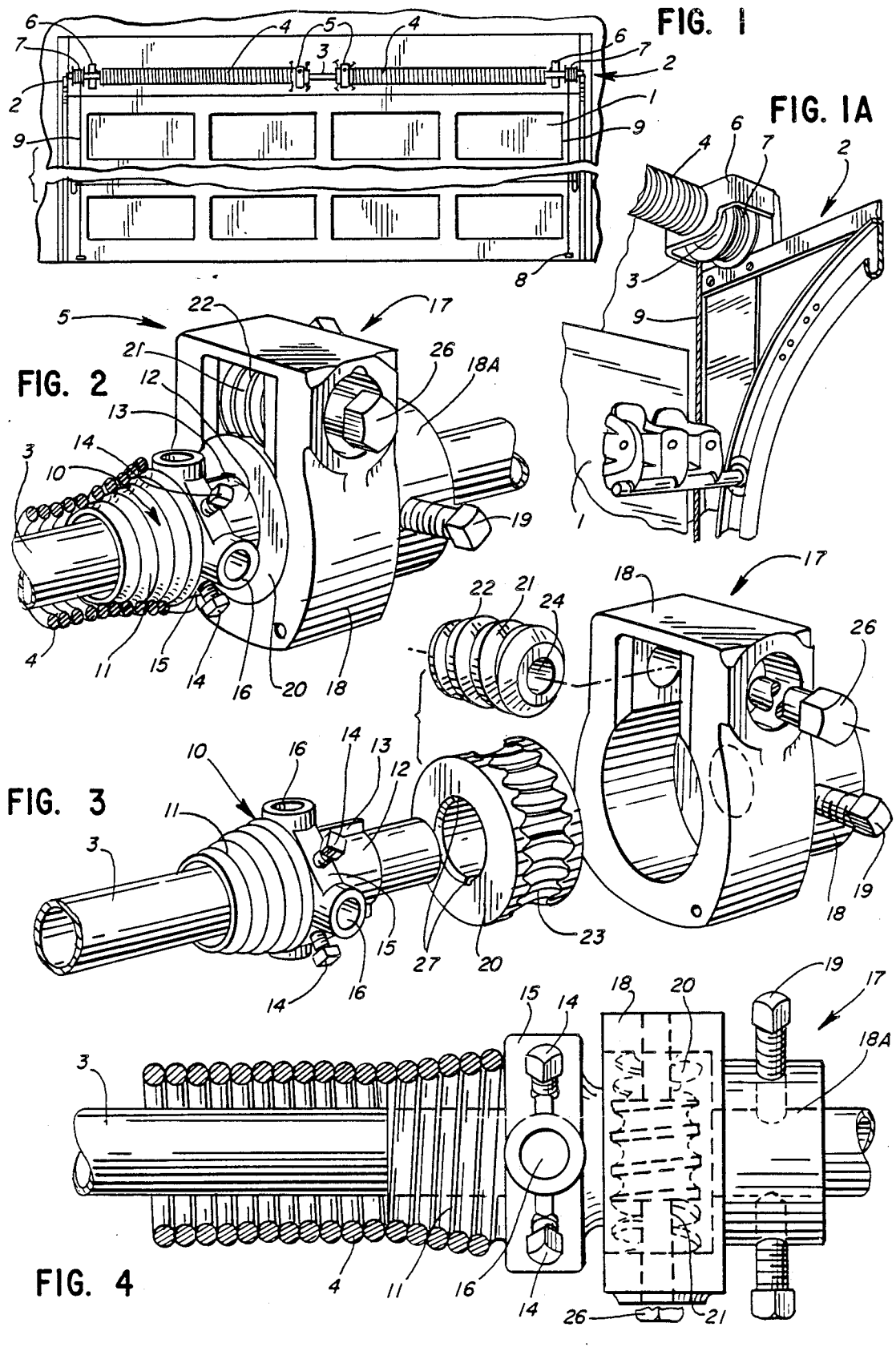

SPRING ADJUSTMENT DEVICE FOR OVERHEAD DOORS

BACKGROUND OF THE INVENTION

1. Field of the Invention

This invention relates generally to overhead door assemblies and, more particularly, to torsion adjustment devices which adjustably fix one rotatable end of a coil spring with respect to a rotatable drive shaft. The angular position of that end of the spring is fixed relative to the shaft and may still be adjusted relative to the shaft in a safe and facile manner.

2. Description of Prior Art

A variety of devices have made use of coil spring torsion forces to provide variable torque load assistance in raising doors that are placed in an elevated position when opened. Such devices require adjustment of the effective spring torque preloading and hence the effective range of available torque tension through an anticipated range of operational movement to optimize the counterbalance the spring provides for the lifted door. These devices employ a variety of modes of adjustment. They typically require rotation of one end of the spring relative to the other to increase or decrease the torque tension.

In many such prior art assemblies the torsion of a coil spring fixed to a shaft at one end, and disposed around the shaft, provides the lift assistance. In these assemblies, one end of the coil spring is fixed to a stationary structure and the other (second) end is fixed to a securing device on a driven shaft such that this second end is rotated with the shaft. A hand bar such as a punch is inserted into the device that secures the spring. The securing device is then released so it can be rotated relative to the shaft subject to the spring being manually held, against its torque force, by the operator holding the bar. The bar is then moved manually to rotate the securement device, which is resecured as soon as the spring and shaft are in a new relative position and the adjustment is complete. Considerable strength may be required in order to hold the spring in torsion. Unexpected or uncontrolled release of the spring during this operation could have serious consequences.

It is therefore desirable to provide means for adjusting the spring torsion loading in overhead door assemblies without requiring the spring to be manually held by the operator during adjustment. Moreover, such means should allow adjustment without release from the mechanism that secures the spring in position.

The spring adjustment means of the present invention is adapted to adjust the preloading positional attachment of the spring at the rotating end. It is a self-contained unit that rotates in its entirety with the shaft while allowing the relative angular position of attachment of the spring to the shaft to be altered without releasing the unit.

The invention is particularly useful in door assemblies such as overhead garage or warehouse doors and is equally applicable in door assemblies where one, or more than one, spring surrounds the shaft. A particularly common overhead door arrangement for which this invention is useful has two springs with one at each end of the shaft. The invention is also equally applicable to door assemblies that are power operated or manually operable.

OBJECTS OF THE INVENTION

Accordingly, it is an object of this invention to provide an improved spring adjustment means for an overhead door assembly that meets the aforementioned needs.

It is a specific object of this invention to provide a self-contained adjustment device that anchors a spring to a shaft while allowing relative adjustment rotation of the spring on the shaft without releasing the anchor mechanism.

It is a further object of this invention to provide a spring adjustment device that avoids the disadvantages of the direct manual rotation adjustment mechanism of the prior art.

Other objects, advantages and features of this invention will become apparent upon reading the following detailed description and appended claims and upon reference to the accompanying drawings.

SUMMARY OF THE INVENTION

In accordance with one embodiment of this invention, a spring torsion adjustment device which achieves the foregoing objects includes a device suitable for attachment to a horizontal shaft and a gearing mechanism that allows angular adjustment of a spring relative to the shaft. The adjustment device is a housing that is adapted for rigid attachment to a shaft. The gearing mechanism includes a toothed member adapted for connection to a spring and rotatably mounted in the housing. A threaded worm is also mounted in the housing so that it engages the teeth of the toothed member. Rotation of the threaded worm induces a corresponding rotation of the toothed member. This rotation is conveyed to one end of a spring that is fixed at its other end and thus causes the effective spring torque to be altered.

BRIEF DESCRIPTION OF THE DRAWINGS

For a more complete understanding of this invention reference should now be made to the embodiment illustrated in greater detail in the accompanying drawings and described below by way of example only. In the drawings:

FIG. 1 is a partially schematic rear elevation of a garage door assembly embodying the present invention;

FIG. 1A is a perspective view of a portion of a door assembly as in FIG. 1.

FIG. 2 is a perspective view of a spring coil adjustment device of the present invention.

FIG. 3 is an exploded perspective view of the device of FIG. 2, showing details of the gearing mechanism.

FIG. 4 is a top view of the device of FIG. 2, partially in section.

It should be understood that the drawings are not necessarily to scale and that the invention is not limited to the particular embodiment illustrated herein.

DETAILED DESCRIPTION OF THE DRAWINGS

Referring first to FIG. 1 for an overview of the invention, a garage door 1 is supported by a guide and support track assembly 2 attached to the door frame 25 in a known manner. A shaft 3 is rotatably mounted on the assembly 2. Two coil counterbalance springs 4 surround the shaft 3 in coaxial relation thereto. One end of each spring is attached to the shaft 3 by an adjustment device 5 and the other end is secured to a fixed portion of the structure such as to the door track assembly by a fixed attachment device 6. A pulley 7 is affixed to the shaft 3 near each end for transferring the counterbalancing torque of the respective spring from the shaft 3 to the door by a lift cable 9. Each cable is fixed at one end to the respective pulley then passes around the pulley and has its opposite end secured to a lower portion of door 1 at an attachment point 8, in a generally known manner. As the door 1 is lowered, cables 9 rotate the pulleys 7 and thereby unwind. The shaft 3 is thereby rotated and the springs 4 are coiled to increase counterbalancing torque loads applied to the shaft 3 and thus to the door 1 through the lift cables 9. Conversely, as the door is raised, the compressed springs unwind by causing the pulleys 7 to wind and thereby retract the cables 9 and assist in the lifting of door 1, all in the usual manner.

Turning now to FIGS. 2-4, a more detailed representation is seen of one of the adjustment devices 5. As will be seen, one adjustment device is used for each spring. Only one is described as both are alike. In each, an annular part 10 coaxially mounted on the shaft 3 includes a universal fitting 11 that engages the spring 4 and a sleeve portion 12 that has axial splines 13. The respective end of the spring 4 is held in a fixed position on the fitting 11. Set screws 14 are threadably engaged through the collar portion 15 to enable the annular part 10 to be selectively secured to the shaft 3. These screws are normally engaged to fix part 10 on shaft 3 but are disengaged from the shaft during adjustment. Prior art adjustment bar sockets 16 are illustrated in the collar, but normally are not utilized with this invention.

A housing 17, which is coaxially mounted on shaft 3 in an appropriate axial position, includes a main portion 18 and a collar portion 18A. Set screws 19 are threadably engaged through the collar 18A and secure the housing 17 to the shaft 3. Screws 19 remain securely tightened to fix the housing 17 to the shaft 3, even throughout the adjustment procedure. The housing 17 accommodates therein a ring gear 20 coaxially disposed about shaft 3 and a worm gear 21. When in position, as shown in FIG. 2, the worm thread 22 of the worm gear engages with the mating teeth 23 of the ring gear. The worm gear 21 has a central cavity 24 and is engaged therein by an externally protruding stud 26 for convenient turning of the worm by an operator.

The ring gear 20 has axial keyways or slots 27 that correspond to the splines 13 on the sleeve 12. When assembled as shown in FIG. 2 the splines 13 engage within keyways 27. The splines 13 are sufficiently long to accommodate axial movement of the part 10 and to remain engaged with keyways 27 during any changes in length of the coil spring 4 which may occur during adjustment. For example, the change in the effective axial length of the spring may be on the order of one inch. This cooperative arrangement prevents the annular part 10 from disengaging from the ring gear 20 while allowing axial adjustment movement as the spring torque is adjusted.

The ring gear 20 does not directly engage the shaft 3 and is freely rotatable thereabout within housing 17, except for the engagement with sleeve 12 and with the worm gear 21. To adjust the effective spring torsion, the set screws 14 are retracted to permit part 10 to rotate on shaft 3, subject of course to its constraint by worm gear 21. In this regard, the worm engagement may provide adequate retention of the angular position of part 10 at all times. However, use of a locking means such as set screws 14 is preferred to avoid unintentional repositioning over extended periods of repeated operation of the door lift mechanism. With the part 10 free on shaft 3, worm gear 21 is rotated by hand or if necessary with a small wrench. This movement turns the worm gear 21 which thereby rotatably drives the ring gear 20. The splines 13, which are engaged with grooves 27, cause the annular part 10 to rotate with the ring gear. The end of spring 4, which is attached to universal fitting 11, is rotated with the annular part 10 to any desired new angular position relative to the shaft 3. Thereby the preset coiling of spring 4 is increased or decreased depending on the direction of rotation. This of course correspondingly adjusts the torsion setting and hence the counterbalancing forces supplied by the respective spring. Moreover, it will be appreciated that the adjustment may be controlled precisely. Once the correct adjustment has been made, screws 14 can be tightened to clamp the annular part 10 to the shaft in the newly selected position and relieve the forces on the other components of the adjustment device and to insure against unintentional movement of the spring end as noted above.

The frictional forces and mechanical advantage of the worm gear are sufficient that the force of the spring on the ring will not rotate the worm when the screws 14 are retracted and the part 10 is free for rotational adjustment about the shaft 3. The operator of the adjustment device therefore need not provide any of the retention force on the spring during adjustment. Moreover, the adjustment mechanism is compact such that the entire adjustment device 5 may rotate with the shaft 4 within clearances of conventional door lift assemblies of this general type. This permits implementation of this invention in conventional door lift assemblies in both new and existing installations, without significant revision of present structures and designs.

From the foregoing it will be seen that the invention disclosed overcomes the problems encountered in adjusting torsion springs by providing an adjustment device that holds the spring in torsion while adjustment takes place and that at no time requires the spring to be released from retention by the holding means. Furthermore, the adjustment may be effected simply by turning a worm by hand or with a small wrench device, and may be controlled precisely.

While one preferred embodiment of the invention is illustrated, it will be understood, of course, that the invention is not limited to this embodiment. Those skilled in the art to which the invention pertains may make modifications and other embodiments employing the principles of this invention, particularly upon considering the foregoing teachings.

What is claimed is:

1. An overhead door lift assembly comprising:
   a rotatable drive shaft, at least one lift pulley affixed to said shaft, flexible lift means attached to each such pulley for rotating and permitting rotation of said shaft in accordance with the vertical positioning movement of said door, at least one coil lift spring disposed coaxial with said shaft for applying torque forces to said shaft, means for attaching one end of said spring in a fixed position relative to said assembly, and means for positioning and retaining the other end of said spring in any selected angular position relative to aid shaft, said positioning and retaining means including:
   first means fixed to said other end of said spring and rotatable relative to said shaft for changing the angular position of said second end relative to said shaft and thereby increasing or decreasing the torque force supplied to said shaft by said spring, second means attached to said shaft in a fixed angular position on said shaft and rotatable therewith and cooperating with said first means for retaining said first means in any relative angular position and for driving said first means to selectively change such relative angular position while so retaining said first means, whereby such selected angular positioning may be effected while said spring is applying a torque force to said shaft and while retaining said other end thereof by said positioning and retaining means through attachment of said second means to said shaft.

2. The invention of claim 1 wherein said second means is a gear drive device disposed in a housing.

3. The invention of claim 2 wherein said gear drive device includes a toothed member driven by a threaded worm.

4. The invention of claim 2 wherein said first means is coaxial with said shaft and is adapted to connect with said gear drive device such that as said gear drive device is driven said first means rotates relative to said shaft.

5. The overhead door assembly of claim 1 wherein said second means is of a configuration that allows unobstructed rotation of said shaft and said positioning and retaining means during rotation of the shaft in accordance with the vertical positioning movement of the door.

6. The overhead door assembly of claim 1 further comprising means for fixing the second means against axial movement relative to said shaft.

7. An assembly for interconnecting a drive shaft and a coiled torque spring disposed coaxial with said shaft for adjusting the torque force applied to the shaft by the spring, comprising:

a first element having means for fixedly engaging one end of such a spring and rotating said end about the axis of a shaft on which said assembly is mounted, a second element including means for affixing said second element to such a shaft for rotation therewith, said first element being rotatable relative to said second element, and means interconnecting said first and second elements and cooperating therewith for retaining said first element in any selected angular position relative to said second element and for selectively rotatably driving said first element relative to said second element to selectively change such relative angular position therebetween and thereby effect selected changes in the angular position of said end of such an attached spring relative to such a shaft while the spring is applying torque force to said first element and through said assembly to such a shaft.

8. The invention of claim 7 wherein said means interconnecting said first and second elements is a gear drive.

9. The invention of claim 8 wherein said second element is a housing for said gear drive.

10. The invention of claim 8 wherein said first element is adapted to rotatably couple with said gear drive device.

11. The invention of claim 8, 9 or 10 wherein said gear drive is a toothed member driven by a threaded worm.

12. The overhead door assembly of claim 7 wherein said second element is of a configuration that allows unobstructed rotation of said shaft and said assembly during rotation of the shaft in accordance with the vertical positioning movement of the door.

13. The overhead door assembly of claim 7 further comprising means for fixing the second element against axial movement relative to such a shaft.

14. A spring torsion adjustment device for an overhead door assembly adapted to attach one end of a shaft surrounding spring to a shaft such that said spring torsion adjustment device rotates in its entirety with said shaft, comprising:

a housing, and means for fixing said housing to said shaft for rotation therewith, a toothed member axially mounted on said shaft and rotatably mounted in said housing, a threaded worm gear mounted in said housing for operative engagement with said toothed member, and a connection means adapted for connection of said spring to said toothed member, whereby as said toothed member is rotated by said threaded worm gear the relative angular position of said end of said spring with respect to said shaft is varied.

15. A spring torsion adjustment device for an overhead door assembly comprising:

a rotatable shaft, a spring surrounding said shaft and having a first end for attachment to said shaft and a second end fixed with respect to an independent external structure, a first part mounted on said shaft and having one end adapted to fixedly engage said first end of said spring, a ring gear axially mounted on said shaft, coupling means for rotatively coupling said first part to said ring gear and permitting longitudinal movement therebetween while so coupled, a worm gear adapted to rotate said ring gear, a housing for said ring and worm gears, said housing mounted on said shaft and configured to allow interdependent rotation of said gears, and anchoring means for fixing said housing to said shaft for rotation therewith whereby said spring torsion adjustment device rotates in its entirety with said shaft.

16. An overhead door assembly comprising:

a door movable between open and closed positions, a support structure to hold said door, a shaft rotatably mounted on said support structure, a means for coupling said door to said shaft such that as said door moves between said open and closed positions said shaft is correspondingly rotated, and at least one coil spring surrounding said shaft, each said spring having a first end for attachment to said shaft by means of a spring torsion adjuster, and a second end fixed with respect to said support structure, said spring torsion adjuster comprising a first annular part mounted on said shaft and having one end adapted to fixedly engage said first end of said spring, a ring gear mounted on said shaft, coupling means for rotatively coupling said ring gear to said first annular part and permitting longitudinal movement therebetween while so coupled, a worm gear adapted to rotate said ring gear, a housing for said worm and ring gears, mounted on said shaft, said housing configured to allow interdependent rotation of said gears, and anchoring means for fixing said housing to said shaft for rotation therewith such that said spring torsion adjuster rotates in its entirety with said shaft.

17. The invention of claim 15 or 16 wherein said first part has a sleeve portion extending along said shaft away from said spring.

18. The invention of claim 17 wherein said anchoring means is an annular collar adapted to receive at least one set screw, each said set screw being adjustable to secure said housing to said shaft.

19. The invention of claim 17 wherein said first coupling means is provided by at least one longitudinal spline on said sleeve and a corresponding number of longitudinal grooves in said ring gear.

20. The invention of claim 15 or 16 wherein said one end of said first part is a universal fitting.

21. The invention of claim 15 or 16 wherein said housing has a sleeve portion extending along said shaft away from said spring.

22. The invention of claim 15 or 16 wherein said anchoring means is an annular collar rigidly attached to said housing and adapted to receive at least one set screw, each said set screw being adjustable to secure said housing to said shaft.

23. The overhead door assembly of claim 16 having two springs surrounding said shaft.

24. The overhead door assembly of claim 16 wherein said door is a garage door.

25. The overhead door assembly of claim 16 wherein said door is mechanically operable.

26. The overhead door assembly of claim 16 wherein said door is manually operable.

* * * * *

UNITED STATES PATENT AND TRADEMARK OFFICE
CERTIFICATE OF CORRECTION

PATENT NO. : 4,981,165

DATED : January 1, 1991

INVENTOR(S) : Eugene J. Miller et al

It is certified that error appears in the above-identified patent and that said Letters Patent is hereby corrected as shown below:

Claim 1, column 4, line 65 - "aid" should read --said--.

Signed and Sealed this

Twenty-eighth Day of July, 1992

Attest:

DOUGLAS B. COMER

Attesting Officer      Acting Commissioner of Patents and Trademarks